United States Patent
Dobbelaere

(10) Patent No.: US 8,650,012 B1
(45) Date of Patent: *Feb. 11, 2014

(54) CACHING INFORMATION TO MAP SIMULATION ADDRESSES TO HOST ADDRESSES IN COMPUTER SYSTEM SIMULATIONS

(75) Inventor: Jeroen Dobbelaere, Heverlee (BE)

(73) Assignee: Synopsys, Inc., Mountain View, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/019,197

(22) Filed: Feb. 1, 2011

Related U.S. Application Data

(63) Continuation of application No. 11/824,880, filed on Jul. 2, 2007, now Pat. No. 7,881,921.

(60) Provisional application No. 60/818,820, filed on Jul. 5, 2006.

(51) Int. Cl.
*G06F 17/50* (2006.01)
*G06F 9/445* (2006.01)

(52) U.S. Cl.
USPC .................. 703/2; 703/21; 703/22; 711/203; 711/207

(58) Field of Classification Search
USPC ................................. 703/2, 22; 711/203, 207
See application file for complete search history.

(56) References Cited

U.S. PATENT DOCUMENTS

| | | | |
|---|---|---|---|
| 4,456,954 A | 6/1984 | Bullions, III et al. | |
| 6,751,583 B1 | 6/2004 | Clarke et al. | |
| 7,363,463 B2 * | 4/2008 | Sheu et al. | 711/203 |
| 7,881,921 B1 * | 2/2011 | Dobbelaere | 703/22 |
| 7,957,951 B2 | 6/2011 | Foster et al. | |
| 8,095,771 B2 * | 1/2012 | Sheu et al. | 711/203 |
| 2006/0259734 A1 * | 11/2006 | Sheu et al. | 711/203 |
| 2008/0215848 A1 * | 9/2008 | Sheu et al. | 711/207 |
| 2008/0319730 A1 | 12/2008 | Clark et al. | |

OTHER PUBLICATIONS

Qin, et al.; A Technique to Exploit Memory Locality for Fast Instruction Set Simulation; Oct. 24, 2005.

\* cited by examiner

*Primary Examiner* — Thai Phan
(74) *Attorney, Agent, or Firm* — Fenwick & West LLP

(57) ABSTRACT

In computer system simulations, previous translations of simulation virtual addresses to physical host addresses can be remembered in a cache. During execution of a simulation program, the simulated computer system generates a simulation virtual address. The simulation virtual address may be translated to a host address. Information associated with the translation can be cached, and subsequent accesses to the simulation virtual address can use the cached information to compute the host address.

20 Claims, 3 Drawing Sheets

CACHING INFORMATION TO MAP SIMULATION ADDRESSES TO HOST ADDRESSES IN COMPUTER SYSTEM SIMULATIONS

RELATED U.S. APPLICATIONS

This application claims priority to the provisional patent application Ser. No. 60/818,820, entitled "Techniques for Optimizing the Memory Path in Whole System Simulations," filed Jul. 5, 2006, and is a continuation application of Ser. No. 11/824,880, entitled "Caching Information to Map Simulation Addresses to Host Addresses in Computer System Simulations," filed Jul. 2, 2007, both of which are hereby incorporated by reference in entirety.

BACKGROUND

In a full system simulation, the full hardware platform (e.g., processor cores, devices, buses, memory) of a computer system is simulated. Processor cores are often simulated by an ISS (Instruction Set Simulator). These cores are used to execute the embedded software of the simulated platform.

When the embedded software wants to access the devices and memory in the simulated system, it issues load and store instructions. The processor core then retrieves or changes the data by putting a request on a bus. In contemporary cores, caches and memory management units (MMUs) make this process more complex—before the request is put on the bus, the core translates the virtual address into a physical address, checks to see if the physical address resides in cache or not, and also checks permissions. Table 1 below shows an example path for a load.

TABLE 1

Example path for a load

Load -> check permissions -> translate to physical address -> check cache -> transfer over the bus -> do the load Thus, simulating a device or memory access requires multiple checks and execution of a relatively large amount of code before a real access to a device or memory can be performed. Various techniques are employed to make simulation of this process faster. These techniques include the use of Transaction Level Modeling (TLM) to simulate the bus to make bus accesses faster, the use of an abstract (but less accurate) model of the processor cache, and/or the use of an extra simulation cache to map a virtual address to a physical address.

Table 2 describes an example of a memory path that is followed before the content of memory is found.

TABLE 2

Example memory path implementation

```
--
unsigned long read32(virtual_address)
{
    if(cache_virtual->contain(virtual_address)) {
        return cache_virtual->read32(virtual_address);
    }
    physical_address =
    translate_virtual_to_physical(virtual_address);
    if(cache_physical->contain(physical_address)) {
        fill_virtual_cache_when_needed( ... );
        return cache_physical->read32(physical_address);
```

TABLE 2-continued

Example memory path implementation

```
    }
    if(cachable(virtual_address, physical_address) {
        return
        fill_virtual_and_or_physical_caches_if_needed(virtual_address,
        physical_address, ... );
    } else {
        device = lookup_device(physical_address);
        return device->read32(physical_address);
    }
}
--
```

Depending on how the processor is simulated, "cache_virtual" and/or "cache_physical" may or may not be available. The implementation of "device→read32" may pass through another (e.g., second level) cache that is outside the simulated processor. However, even when no processor cache is simulated and TLM is used to simulate the bus, a lot of processing time may still be consumed.

SUMMARY

A method that can accomplish memory accesses more quickly in full system simulations would be valuable. Embodiments according to the present invention provide this and other advantages.

In one embodiment, during execution of a simulation program, the simulated computer system generates a simulation virtual address. The simulation virtual address may be translated to a host address. Information associated with the translation can be cached, and subsequent accesses to the simulation virtual address can use the cached information to compute the host address.

In one such embodiment, the information included in the cache includes the start of a range of simulation virtual addresses associated with the translation, the end of the range, and/or the length of the range. The information may also include a pointer that identifies a block of host memory associated with the range of simulation virtual addresses, or an offset measured from the pointer. The cached information can be used in combination with a valid simulation virtual address to compute a host address that corresponds to the simulation virtual address. That is, if the same simulation virtual address is generated, then the corresponding host address can be computed using the cached information. Furthermore, if a new (different) simulation virtual address is generated, and the new address is in the same range of simulation virtual addresses as the first simulation virtual address, then the cached information can be used to compute a host address that corresponds to the new address. If the new address is outside the range that includes the first address, then the new address can be translated to a host address, and the cache can be updated to include information associated with the translation of the new address.

In summary, embodiments of the invention introduce a smartly crafted cache that makes it possible to bypass aspects of the path usually taken for memory accesses. If the cache contains an entry for a particular simulation virtual address, or for a range of addresses that includes the simulation virtual address, a corresponding host address that allows the underlying host memory to be accessed directly can be computed. If not, the normal access path is used to map a simulation virtual address to a host address and to update the cache. The cache is completely transparent for the behavior of the model, and results in faster memory accesses. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Figure 1:
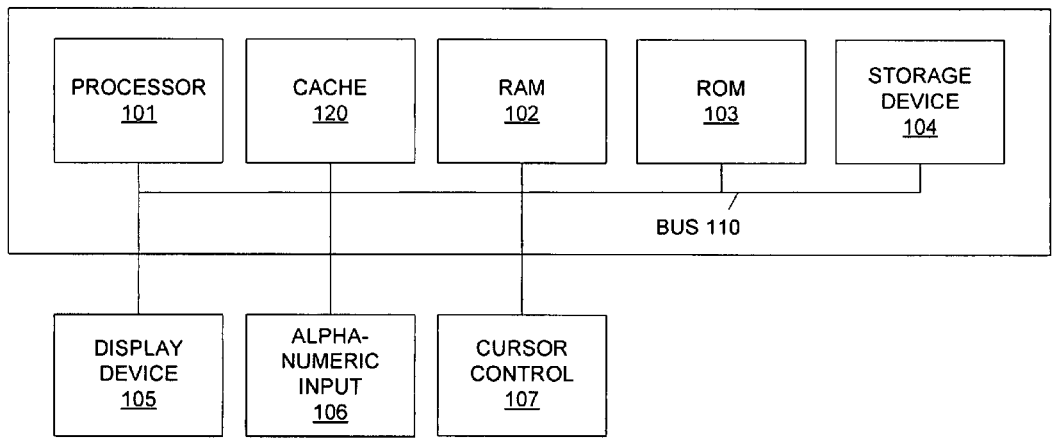
FIG. 1 is a block diagram of a device upon which embodiments of the present invention can be implemented.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "accessing," "translating," "caching," "using," "computing," "mapping," "identifying," "reading," "writing," "determining," "generating," "receiving," "setting," "checking" or the like, refer to actions and processes (e.g., flowcharts 300 and 500 of FIGS. 3 and 5, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

FIG. 1 is a block diagram of a host system 100 upon which embodiments of the present invention can be implemented. In general, system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions, an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101.

Display device 105 utilized with device 100 may be a liquid crystal device, cathode ray tube, or other display device suitable for creating graphic images and alphanumeric characters recognizable to the user. Cursor control device 107 allows a user to dynamically signal the two-dimensional movement of a visible symbol (pointer) on a display screen of display device 105.

System 100 executes a full system simulator that simulates a computer system, including processor cores, peripheral devices, memories, interconnection buses, and network connections. The term "host" is used herein to refer to elements of system 100 (e.g., hardware elements of system 100), while the term "simulated" or "simulation" is used herein to refer to elements of the computer system being simulated by the full system simulator executed by system 100.

Memory addresses that are generated by the simulation software may be referred to herein as simulation virtual addresses and simulation physical addresses. The simulation addresses refer to simulated memory locations seen by the simulation software but not necessarily to the actual physical locations of the data or content being accessed. The simulation virtual and/or physical addresses are translated to a real memory address in host memory (e.g., in RAM 102 or data storage device 104). The host memory address refers to the actual location of the data or content being accessed by the simulation software, as seen by the simulation software itself. The host memory (e.g., in RAM 102 and data storage device 104) itself may utilize virtual addresses and virtual memory. Accordingly, system 100 may also include a memory management unit (not shown) that supports non-simulation virtual memory and paging by translating non-simulation virtual addresses into non-simulation physical addresses.

According to embodiments of the invention, system 100 utilizes a specially constructed cache 120 to map simulation virtual addresses directly to an address in host memory. In the example of FIG. 1, the cache 120 is placed between processor 101 and RAM 102; however, the present invention is not limited to this type of configuration.

Figure 2:
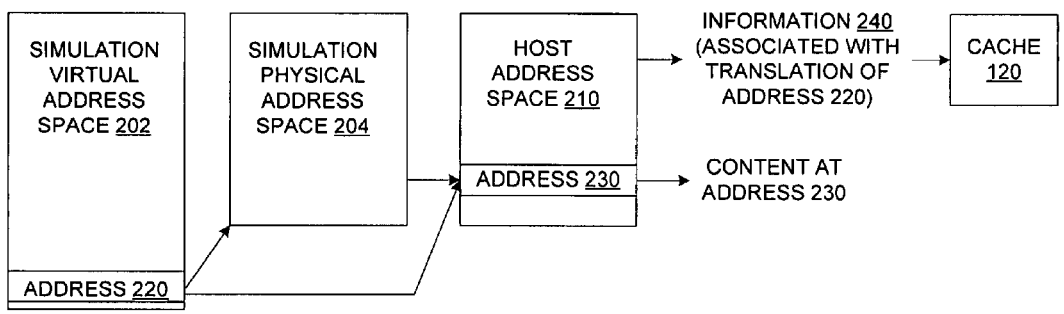
FIG. 2 is a block diagram showing simulation virtual address space, simulation physical address space, and host memory address space according to an embodiment of the present invention.

FIG. 2 is a block diagram that illustrates the relationship between simulation virtual address space 202, simulation physical address space 204, and host memory address space 210. According to embodiments of the present invention, a valid simulation virtual address 220 (e.g., an address in address space 202) can be mapped to a simulation physical address 230 in address space 204, which in turn can be mapped to a host address 240 in address space 210. Alternatively, simulation virtual address 220 in address space 202 can be mapped to a cache line in a virtual cache (not shown) in host address space 210 (here, "virtual cache" refers to an element of host memory that caches virtual addresses, and not to a simulated cache). Furthermore, simulation virtual address 220 in address space 202 can instead be mapped to a simulation physical address in address space 204, which in turn can be mapped to a cache line (not shown) in a physical cache (here, "physical cache" refers to an element of host memory that stores some subset of the addresses in host address 210).

For example, a simulation program may want to access data that is located on simulation virtual address 0x00020000. The simulated processor core, by looking through a memory map table, can determine that this simulation virtual address is mapped to simulation physical address 0x80020000, and can request a memory read on that simulation physical address. The simulated processor determines that the simulation program had allocated memory for simulation physical addresses 0x800000000 through 0x81000000 on host address 0x12340000 (this latter address is a pointer to the first address in a block of host memory, where the block has a specified range; in the C and C++ programming languages, for example, the pointer is provided using the "malloc" subroutine). This results in an actual read at host address 0x12360000 (0x12340000 plus 0x00020000)—the simulation virtual address 0x00020000 is translated to host address 0x12360000, which is the actual location of the content sought by the simulation program.

According to embodiments of the present invention, previous mappings or translations of simulation virtual addresses to host addresses can, generally speaking, be remembered in cache 120 (FIG. 1). More specifically, when simulation virtual address 220 is translated to a host address 230, not only is the content at the host address 230 accessed, but additional information 240 related to the translation of address 220 is retrieved. The additional information 240 is stored in cache 120 and can be subsequently accessed using simulation virtual address 220. Consequently, if simulation virtual address 220 is again generated by the simulation program, it is not necessary to perform the complete (conventional) translation. Instead, the information 240 stored in cache 120 is used in combination with the address 220 to compute host address 230. Moreover, because accesses generally exhibit spatial locality, a host address can be computed for other, nearby simulation virtual addresses (e.g., those that are in the same range as simulation virtual address 220), using the information 240 stored in cache 120 (the additional information that was retrieved as a result of the translation of address 220). That is, if a second simulation virtual address that is in the same range of addresses as simulation virtual address 220 is generated, then a host address corresponding to the second address can be computed using the information 240 in cache 120, in combination with the second address.

The information that is stored in cache 120 can include the start of the range of simulation virtual addresses that includes simulation virtual address 220, the end of that range, and/or the length of the range. Any two of these items of information is sufficient for determining the third item, and so only two items may be stored in the cache. The information stored in cache 120 can also include a pointer that identifies the block of host memory that corresponds to the range of simulation virtual addresses including simulation virtual address 220.

Alternatively, the information stored in cache 120 may include an offset measured from the pointer to the host address that corresponds to simulation virtual address 220. In general, the information stored in cache 120 is sufficient for computing a host address as a function of a simulation virtual address.

In one embodiment, cache 120 also includes a flag (e.g., a bit) that is set to indicate whether the endianness of the host memory is different from the endianness of the access. If they are different, the order of the bits in the access can be reversed.

Figure 3:
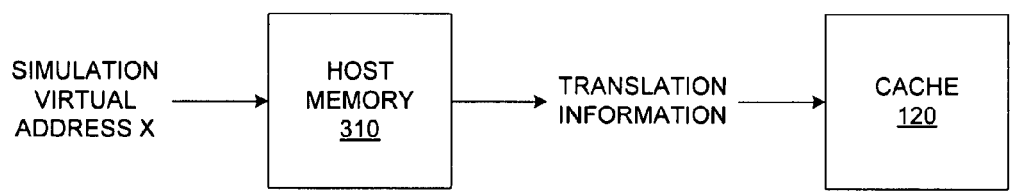
FIG. 3 is a block diagram showing information flow between host memory and a cache according to an embodiment of the present invention.

In general, as shown in FIG. 3, when the simulation program attempts an access to a simulation virtual address 'X,' and information for the address 'X' is not in cache 120 of FIG. 1, then the access is first translated to a host address in the address space of host memory 310 (e.g., RAM 102 or data storage device 104 of FIG. 1), and then the range of virtual addresses for which the translation applies is retrieved. Also, the host address for this translation is retrieved, so that the memory access can be mapped to "X minus (range_start) plus (host_address)." This information is then stored in cache 120.

Subsequently, a memory access to any address 'Y' (where 'Y' includes 'X') can be computed as follows:

if (range_start<=Y) and (Y+access_size<range_end) then
   memory_address=Y−range_start+host_address
else
   memory_address=slow_lookup(Y, . . . )
   update_cache 120 when_possible(Y, . . . ).

In the above, "slow_lookup" refers to the conventional translation (mapping) process.

In one embodiment, a simulation virtual address is mapped to an entry in the cache 120 based on a hash function that uses the number of entries in the cache and the simulation virtual address: hash(virtual_address, n), where 'n' is the number of entries in cache 120, and where 'n' can be any integer number up to the number of addresses in the simulation virtual address space.

Figure 4:
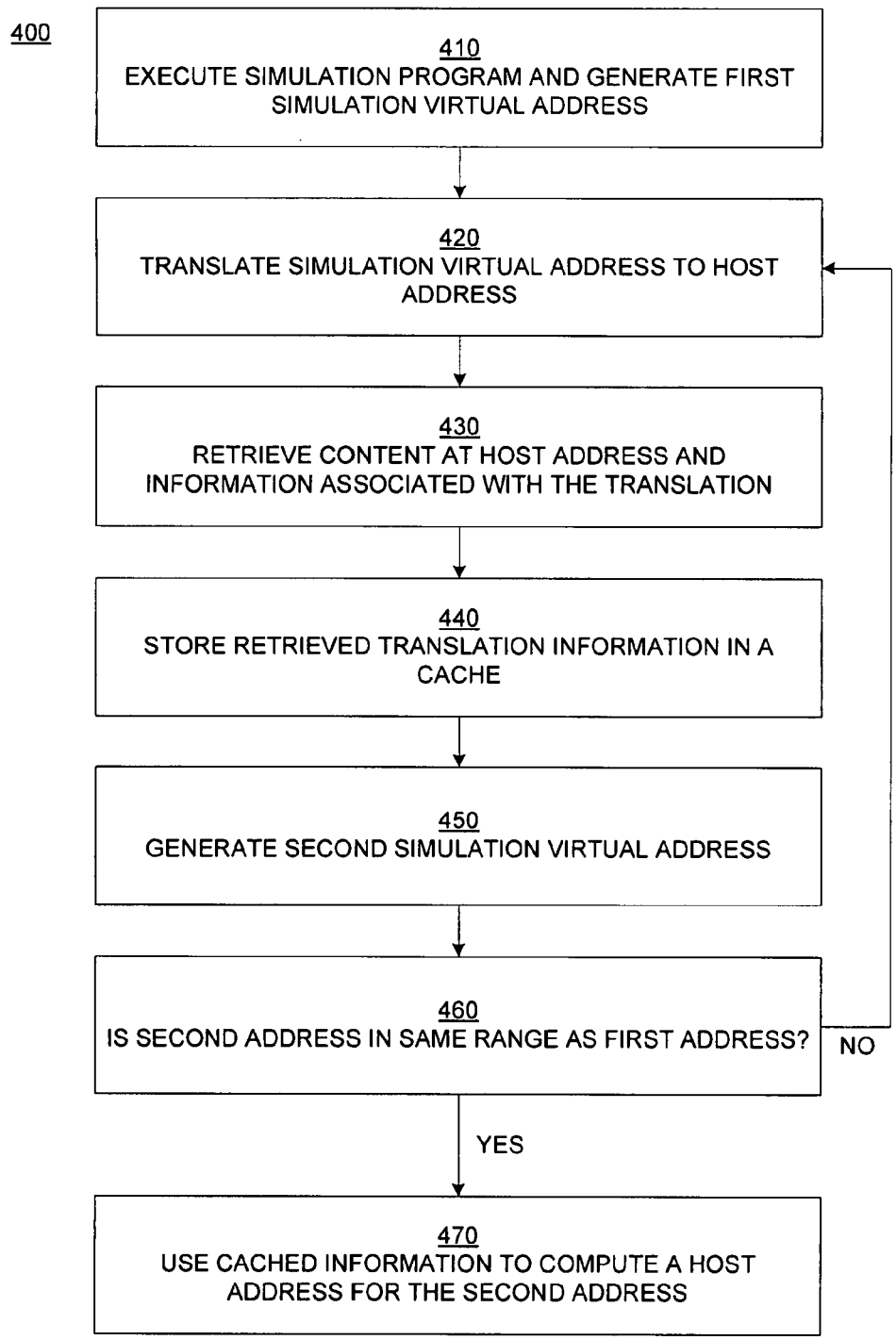
FIG. 4 is a flowchart of a computer-implemented method of full system simulation according to the present invention.

FIG. 4 is a flowchart 400 of an embodiment of a computer-implemented method of full system simulation according to the present invention. Although specific steps are disclosed in flowchart 400, such steps are exemplary. That is, embodiments of the present invention are well-suited to performing various other steps or variations of the steps recited in flowchart 400. The steps in flowchart 400 may be performed in an order different than presented and that the steps in flowchart 400 are not necessarily performed in the sequence illustrated.

In block 410, a simulation program is executing and a first simulation virtual address is generated.

In block 420, the simulation virtual address is translated to a host address in host memory.

In block 430, content at the host address is retrieved, and information associated with the translation is also retrieved.

In block 440, the information retrieved in block 430 is stored in cache 120 (FIG. 1). The information that is retrieved and cached is sufficient enough such that, each time the simulation virtual address of block 410 is subsequently generated, or each time a simulation virtual address in the same range as the simulation virtual address of block 410 is generated, a corresponding host address can be computed using the cached information in combination with the generated simulation virtual address.

In block 450 of FIG. 4, a second simulation virtual address is generated (note that the first and second simulation virtual addresses may be the same as each other, or different from each other).

In block 460, a determination is made with regard to whether the second simulation virtual address lies within the same range as the first simulation virtual address (the address of block 410). If so, then flowchart 400 proceeds to block 470; if not, then flowchart 400 returns to block 420.

Figure 5:
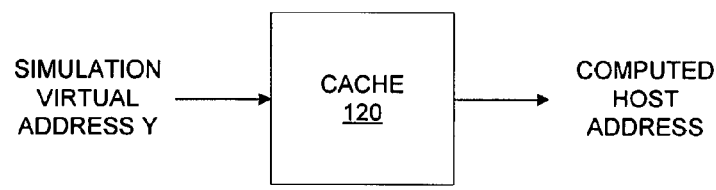
FIG. 5 is a block diagram showing information flow through a cache according to an embodiment of the present invention.

In block 470, the information that was retrieved and cached in blocks 430 and 440 can be used in combination with the second simulation virtual address to compute a second host address that corresponds to the second simulation virtual address, as illustrated in FIG. 5.

The present invention can be implemented in different embodiments. The features of each embodiment described below can be used alone or in combination with feature(s) from one or more of the other embodiments.

In one embodiment, the cache 120 (FIG. 1) is a shared read/write cache—the same cache is used for reading from and writing to host memory. In another embodiment, the cache 120 is implemented as two caches: one cache used only for read operations, and another cache used only for write operations.

In one embodiment, a cache 120 is associated with a particular register of the simulated processor core. There may be a cache for each register or for selected registers only. In this embodiment, it is assumed that a memory access through a register will be similar to the preceding memory access through that register.

In one embodiment, a cache 120 is associated with a specific instruction of a code fragment of the simulated processor core. There may be a cache for each instruction or for selected instructions only. In this case, it is assumed that a certain instruction (e.g., in a loop) will access the same (spatially local) part of host memory each time it is executed.

In one embodiment, a cache 120 associated with one or more instructions of a code fragment. In this case, an analysis of the simulation program may show that several instructions are accessing the same (spatially local) part of host memory. Accordingly, those instructions are assigned to share the same cache.

In one embodiment, in a situation where several instructions of a code fragment are accessing similar (spatially local) memory, the simulator's code translator can split up the created code into either a "fast path" (that uses cache 120 to perform address translations) or a "slow path" (that uses a conventional approach for address translations), based on the knowledge that succeeding accesses will reside inside the same range of addresses as preceding memory accesses. When necessary, the number of iterations of an instruction loop can be computed in such way that all accesses in the loop can be done directly without the need for either a conventional translation or a translation that relies on cache 120. When coming out of such a loop, a switch between the slow path and the fast path can be made, depending on the new access pattern. In essence, the step of checking the cache 120 to determine whether or not a simulation virtual address is in the cache can be skipped for an instruction loop, because that determination has already been made in a preceding loop.

For example, a "memset" could look like this:
R0: content
R1: start address
R2: end address
memset:
str R0, [R1], +#4
cmp R1, R2
blt memset
mov pc, lr
The translated code for this fragment could look like this:
memset:
execute(str R0, [R1], +#4)
if (R1>=R2) {
    goto memset_exit
}
if (in cache(R1)) {
    iterations=(min(range end, R2)-R1)/4
    destination=host pointer(R1)
    for(int i=0; i<iterations; ++i) {
        fast_store(R0, destination);
        destionation+=4;
        R1=R1+4
    }
}
if (R1<R2) {
    goto memset;
}
memset_exit:
execute(mov pc, lr)

In one embodiment, a decision is made at run time with regard to which approach or version to implement, as well as which options or functions to implement with the version selected. For example, one version could utilize one cache entry, based on a size, shared between read and write, as follows:
if ((address-cache0_start)<cache0_size) {
    return*(unsigned long*)(address-cache0_host_base); }
return slow_read(address);
Another version could utilize 16 entries, based on a size, with read and write separate, as follows:
int cache1_index=compute_cache1_index(address)
if ((address-cache1_read_start[cache1_index])<
cache1_read_size[cache1_index]) {
    return*(unsigned long*)(address-
cache1_read_host_base[cache1_index]);
}
return slow_read(address)
The simulation could decide that it makes sense to combine the above two versions, as follows:
if ((address-cache0_start)<cache0_size) {
    return*(unsigned long*)(address-cache0_host_base); }
int cache0_index=compute_cache0_index(address)
if ((address-cache1_read_start[cache1_index])<
cache1_read_size[cache1_index]) {
    return*(unsigned long*)(address-
cache1_read_host_base[cache1_index]);
}
return slow_read(address);
The simulation could also decide, at some point, that it makes sense to use a different "compute_cache1_index" function. At some later time, the simulation could decide to fall back on a former version or function, or a different one, depending on the situations encountered. An example where this may be advantageous is a system where no MMU is used, and where one relatively large memory is available, together with several smaller sized memories. If the simulation can decide that most accesses are done on the larger memory, it can handle that as a special situation to be checked first, without sacrificing speed when the access is to one of the other (smaller) memories.

In summary, according to embodiments of the present invention, memory accesses can be accomplished more quickly in full system simulations. A smartly crafted cache is introduced, making it possible to bypass aspects of the path usually taken for memory accesses. If the cache contains an entry for a particular simulation virtual address, or for a range of addresses that includes the simulation virtual address, a corresponding host address that allows the underlying host memory to be accessed directly can be computed. If not, the normal access path is used to map a simulation virtual address to a host address.

Embodiments of the present invention are thus described. While the present invention has been described in particular embodiments, it should be appreciated that the present invention should not be construed as limited by such embodiments, but rather construed according to the below claims.

What is claimed is:

1. A system comprising:
a processor; and
a system simulator configured to:
  execute a simulation program to simulate a computer system, the simulated computer system accessing data at a simulation virtual address representing a logical memory location identified by the simulation program;
  translate, at a first time during the simulation of the computer system, the simulation virtual address to a host address in a host memory by at least determining a range of host addresses in the host memory allocated to cover the simulation virtual address memory, the host address representing a physical memory location in the system simulator;
  store information obtained for translating the simulation virtual address to the host address; and
  at a second time during the simulation of the computer system and subsequent to the first time and, access data at the simulation virtual address by retrieving and using the stored information.

2. The system of claim 1, wherein the translation comprises mapping the simulation virtual address to a simulation physical address, the simulation physical address mapped to the host address.

3. The system of claim 1, wherein the simulation virtual address lies in a range of simulation virtual addresses, wherein the information comprises information selected from the group consisting of: a start of the range; an end of the range; and a length of the range.

4. The system of claim 3, wherein the information further comprises information selected from the group consisting of: a pointer identifying a block of the range of host addresses; and an offset measured from the pointer to the host address.

5. The system of claim 3, wherein the system simulator is further configured to:
generate another simulation virtual address;
determine whether the other simulation virtual address lies within the range; and
responsive to the other simulation virtual address lying within the range, use the information to compute another host address corresponding to the other simulation virtual address.

6. The system of claim 1, wherein the system simulator is further configured to set a flag to indicate whether endianness of the host memory is different from endianness of the simulated computer system.

7. The system of claim 1, wherein the system simulator is further configured to map the simulation virtual address to the host address based on a hash function that uses a number of entries in a cache memory and the simulation virtual address.

8. The system of claim 1, wherein the system simulator is further configured to select at run time a first function to be used at the first time, and to subsequently select a second function to be used at the second time in place of the first function.

9. A non-transitory computer-readable storage medium storing instructions, the instructions when executed by a processor cause the processor to:
execute a simulation program to simulate a computer system, the simulated computer system accessing data at a first simulation virtual address representing a logical memory location identified by the simulation program;
translate, at a first time during the simulation of the computer system, the simulation virtual address to a host address in a host memory by at least determining a range of host addresses in the host memory allocated to cover the simulation virtual address memory, the host address representing a physical memory location in the system simulator;
store information obtained for translating the simulation virtual address to the host address; and
at a second time subsequent to the first time and during the simulation of the computer system, access data at the simulation virtual address by retrieving and using the stored information.

10. The computer-readable storage medium of claim 9, wherein the instructions when executed by the processor further cause the processor to map the simulation virtual address to a simulation physical address, the simulation physical address mapped to the host address.

11. The computer-readable storage medium of claim 9, wherein the simulation virtual address lies in a range of simulation virtual addresses, wherein the information comprises information selected from the group consisting of: a start of the range; an end of the range; and a length of the range.

12. The computer-readable storage medium of claim 11, wherein the information further comprises information selected from the group consisting of: a pointer identifying a block of the host memory; and an offset measured from the pointer to the first host address.

13. The computer-readable storage medium of claim 11, further comprising instructions that cause the processor to:
generate another simulation virtual address;
determine whether the other simulation virtual address lies within the range; and
responsive to the other simulation virtual address lying within the range, use the information to compute another host address corresponding to the other simulation virtual address.

14. The computer-readable storage medium of claim 9, further comprising instructions that cause the processor to set a flag to indicate whether endianness of the host memory is different from endianness of the simulated computer system.

15. The computer-readable storage medium of claim 9, further comprising instructions that cause the processor to map the simulation virtual address to the host address based on a hash function that uses a number of entries in a cache and the simulation virtual address.

16. The computer-readable storage medium of claim 9, further comprising instructions that cause the processor to execute a first function to be used at the first time and to select a second function at the second time in place of the first function.

17. A computer-implemented method comprising:
- executing a simulation program to simulate a computer system, the simulated computer system accessing data at a simulation virtual address representing a logical memory location identified by the simulation program;
- translating, at a first time during the simulation of the computer system, the simulation virtual address to a host address in a host memory by at least determining a range of host addresses in the host memory allocated to cover the simulation virtual address memory, the host address representing a physical memory location in the system simulator;
- storing information obtained for translating the simulation virtual address to the host address; and
- at a second time subsequent to the first time and during the simulation of the computer system, accessing data at the simulation virtual address by retrieving and using the stored information.

18. The method of claim 17, further comprising mapping the simulation virtual address to a simulation physical address, the simulation physical address mapped to the host address.

19. The method of claim 17, wherein the simulation virtual address lies in a range of simulation virtual addresses, wherein the information comprises information selected from the group consisting of: a start of the range; an end of the range; and a length of the range.

20. The method of claim 17, wherein the information further comprises information selected from the group consisting of: a pointer identifying a block of the host memory; and an offset measured from the pointer to the first host address.

* * * * *